(12) United States Patent
Lu et al.

(10) Patent No.: US 7,472,633 B2
(45) Date of Patent: Jan. 6, 2009

(54) TRANSMISSION APPARATUS FOR BALANCE TEST OPERATION

(75) Inventors: Yung-Hsiang Lu, Chiayi (TW); Ping-Shuo Lin, Chiayi (TW)

(73) Assignee: Factory Automation Technology Co., Ltd., Chiayi (TW)

( * ) Notice: Subject to any disclaimer, the term of this patent is extended or adjusted under 35 U.S.C. 154(b) by 424 days.

(21) Appl. No.: 11/449,708

(22) Filed: Jun. 9, 2006

(65) Prior Publication Data
US 2007/0295137 A1   Dec. 27, 2007

(51) Int. Cl.
*B23B 23/00* (2006.01)
*B23B 25/00* (2006.01)

(52) U.S. Cl. .............. 82/170; 82/164; 279/133
(58) Field of Classification Search .......... 82/164, 82/170; 279/133; 29/27 C, 27 R
See application file for complete search history.

(56) References Cited

U.S. PATENT DOCUMENTS

| | | | | |
|---|---|---|---|---|
| 1,824,769 A | * | 9/1931 | Broden | 82/164 |
| 2,173,530 A | * | 9/1939 | Blazek | 451/460 |
| 2,208,879 A | * | 7/1940 | Blazek et al. | 451/398 |
| 2,359,470 A | * | 10/1944 | Eddison | 408/2 |
| 2,540,186 A | * | 2/1951 | Bullard et al. | 29/38 A |
| 3,216,717 A | * | 11/1965 | Bagge et al. | 269/47 |
| 4,197,629 A | * | 4/1980 | Reese et al. | 29/560 |
| 4,746,131 A | * | 5/1988 | Mathes | 279/154 |
| 5,267,380 A | * | 12/1993 | Ronge et al. | 29/33 R |
| 2004/0051256 A1 | * | 3/2004 | Ayrton | 279/4.01 |

* cited by examiner

*Primary Examiner*—Willmon Fridie
(74) *Attorney, Agent, or Firm*—Rosenberg, Klein & Lee

(57) ABSTRACT

A transmission apparatus includes a frame, a rotating disk fitted on the frame, platforms on the rotating disk, an inner rotating member fitted on the frame, a clutch, and an actuating mechanism for moving the clutch; the platforms have clamping jaws for clamping a work piece; the clutch is joined to the inner rotating member, and can be engaged with and disengaged from a transmission gear rotated with a power source; after one of the platforms is secured to the inner rotating member, the actuating mechanism will exert force to separate the clutch from the transmission gear, and the clamping jaws clamp the work piece, and next the clutch is engaged with the transmission gear; thus, the power source causes rotation of the transmission gear, the clutch, the inner rotating member, and said working platform so as to test whether the work piece is positioned in balanced position.

8 Claims, 5 Drawing Sheets

TRANSMISSION APPARATUS FOR BALANCE TEST OPERATION

BACKGROUND OF THE INVENTION

1. Field of the Invention

The present invention relates to a transmission apparatus for balance test operation, more particularly one, which includes a transmission gear and a clutch capable of engaging and disengaging the transmission gear, and which allows a teat to be carried out for finding out whether a work piece has been positioned in a balanced position before a machining action is started.

2. Brief Description of the Prior Art

Lathes are important machining apparatuses. Referring to FIG. 1, a currently existing vertical lathe 9 includes a supporting frame 91, cutting tools 92, two shutters 93, a rotating disk 94, and two working platforms 95. The cutting tools 92 are positioned in a holding space 911 of the supporting frame 91. The shutters 93 are pivoted to the supporting frame 91 for closing the holding space 911. Each of the working platforms 95 has several clamping jaws 951 for clamping work pieces. The working platforms 95 are moved into the holding space 911 of the supporting platform 91 in sequence by means of the rotating disk 94 such that the workpieces are machined by means of the cutting tools 92; before each cutting process is started, the shutters 93 will be closed to prevent cutting oil and iron bits from getting out of the holding space 911 to dirty the environment as well as preventing the work pieces from flying out and hurting people.

After the lathe finishes machining a work piece fixed on a working platform, this working platform will be moved out of the holding space 911 by means of the rotating disk 94, and next this working platform 95 will be firmly fixed to the supporting frame 91, and the clamping jaws of this working platform will release the work piece. Then, this work piece is removed from this working platform, and another work piece is positioned on this working platform, and clamped by means of the clamping jaws.

The above lathe structure has a disadvantage: when operating such a lathe, the operators can't carry out test operation to find out whether a work piece has been held in a balanced position on a working platform 95 by means of the clamping jaws 951. It isn't possible to find out whether a work piece is held in a balanced position until this work piece is moved into the holding space 911 together with a working platform 95, and the spindle makes this working platform 95 rotate together with it to carry out a balance test; if it is found out that this work piece isn't in a balanced position, this working platform 95 has to be moved out of the holding space 911, and this work piece released and repositioned, wasting much time. Or alternatively, the operator can rotate this working platform 95 manually to find out whether this work piece is held in its balanced position. However, it is difficult to find tiny abnormalities by means of manual testing. If a work piece is machined in an unbalanced position, the work piece will become damaged and useless, and even fly out to cause damage to the lathe and hurt people.

SUMMARY OF THE INVENTION

It is a main object of the invention to provide a transmission apparatus for balance test operation to overcome the above-mentioned problems.

The transmission apparatus of the present invention includes a frame, a rotating disk fitted on the frame, two working platforms, an inner rotating member fitted on the frame, a clutch joined to the inner rotating member in a movable manner, and an actuating mechanism for moving the clutch.

The working platforms are fitted on the rotating disk in a symmetric and rotatable manner, and have clamping jaws for clamping work pieces. The clutch is joined to the inner rotating member, and can be moved between a disengaged position and an engaged one, in which engaged position the clutch is engaged with a transmission gear rotated by means of the power source.

In use, after the rotating disk is rotated so as to make one of the working platforms face and securely joined to the inner rotating member, the actuating mechanism will exert force to separate the clutch from the transmission gear, and the clamping jaws clamp a work piece on said working platform, and next the actuating mechanism will make the clutch engage the transmission gear; thus, rotation of the power source will cause rotation of the transmission gear, the clutch, the inner rotating member, and said working platform so as to carry out a test in respect of balance of the work piece.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
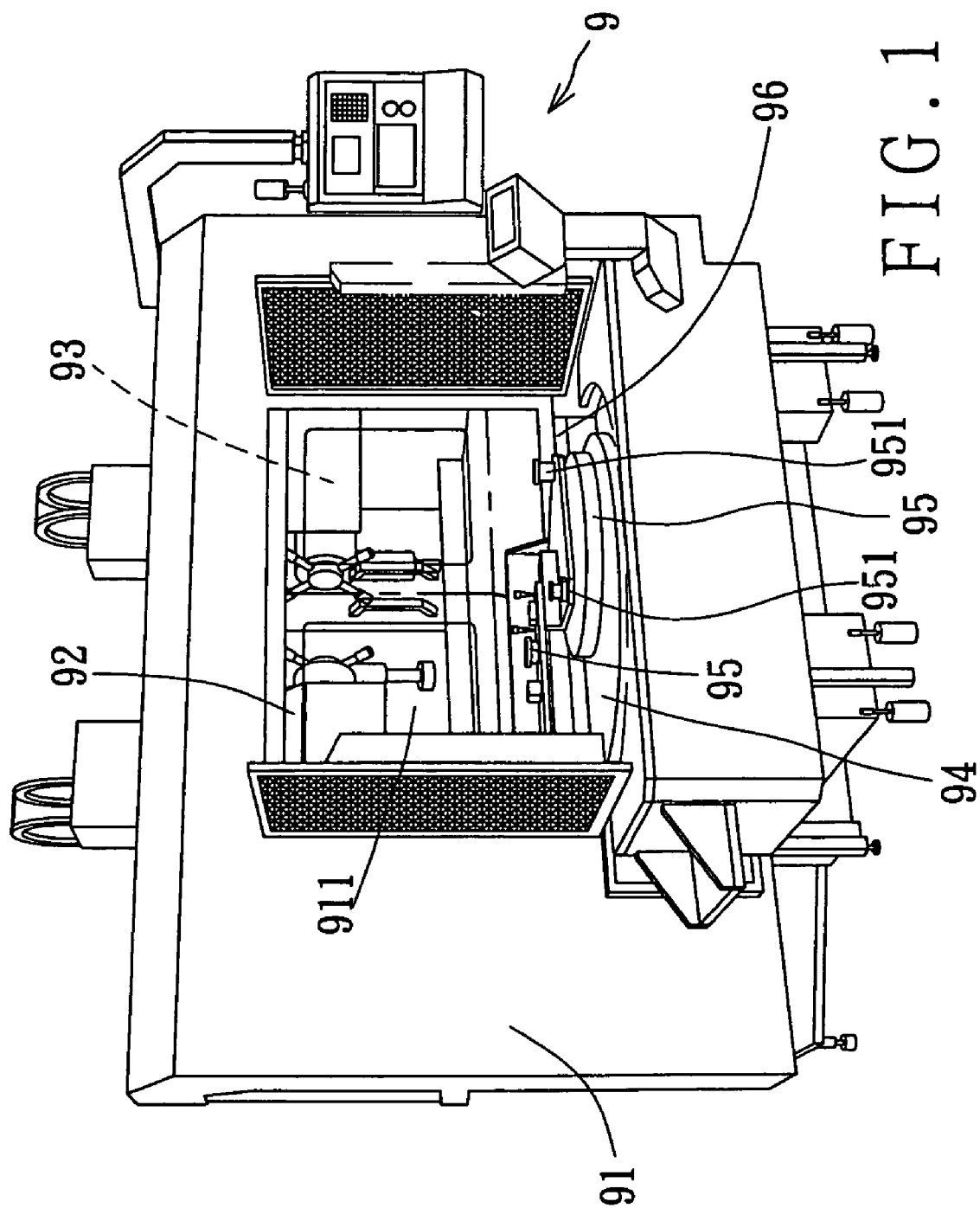
FIG. 1 is a perspective view of the prior art.
Figure 2:
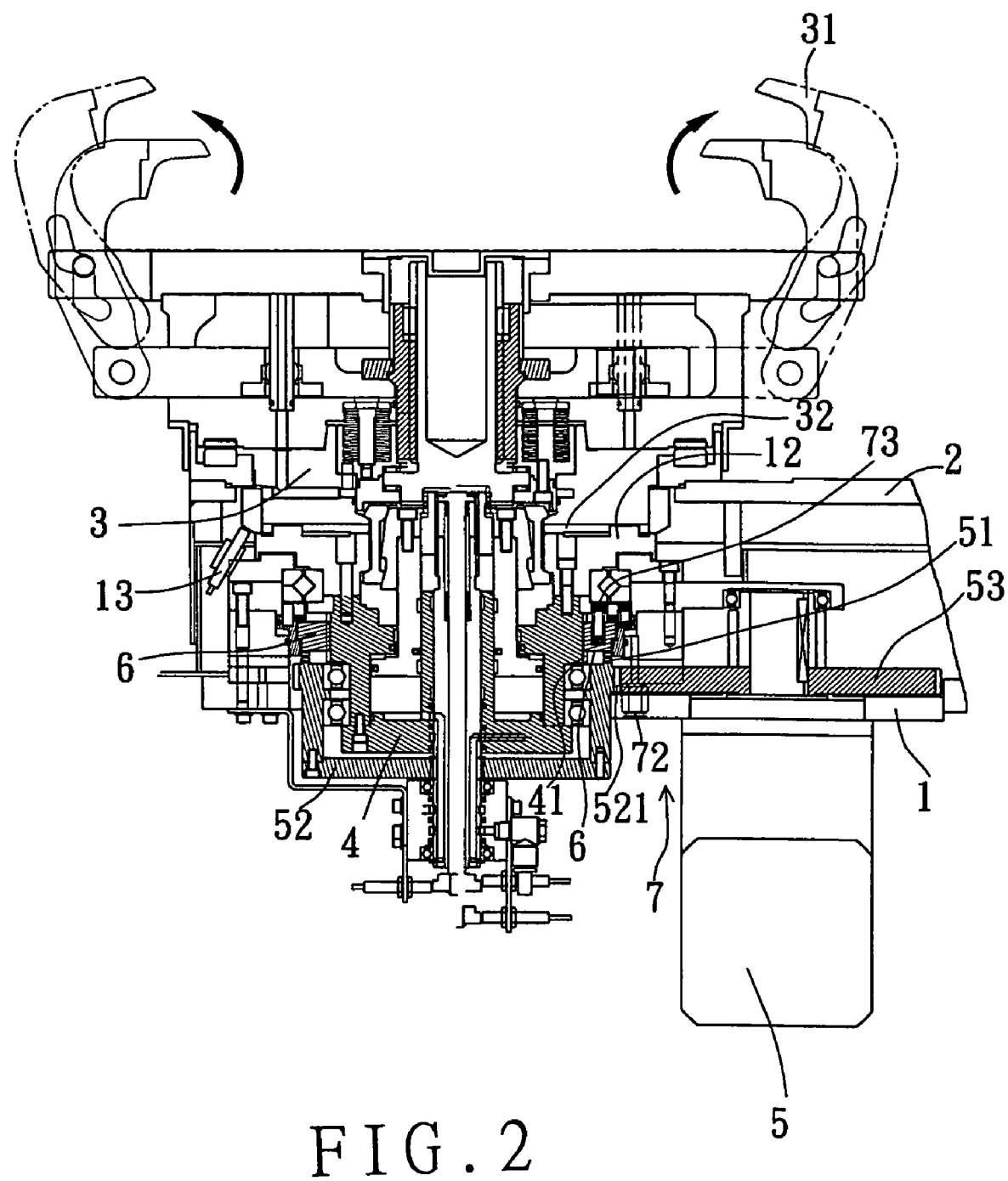
FIG. 2 is a section of the invention with the clutch separate from the transmission gear, and the clamping jaws in their releasing position.
Figure 3:
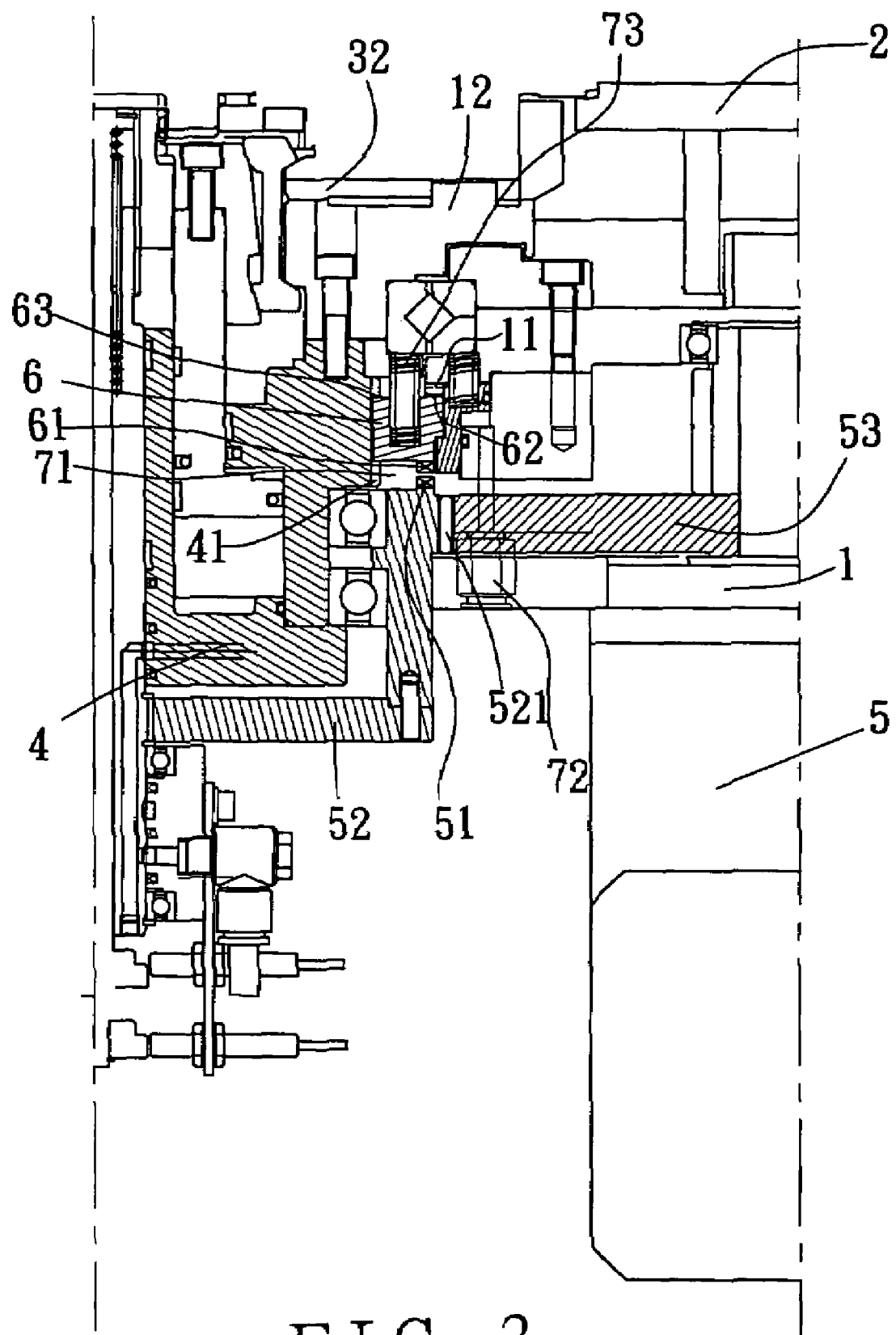
FIG. 3 is a partial enlarged view of FIG. 2.
Figure 4:
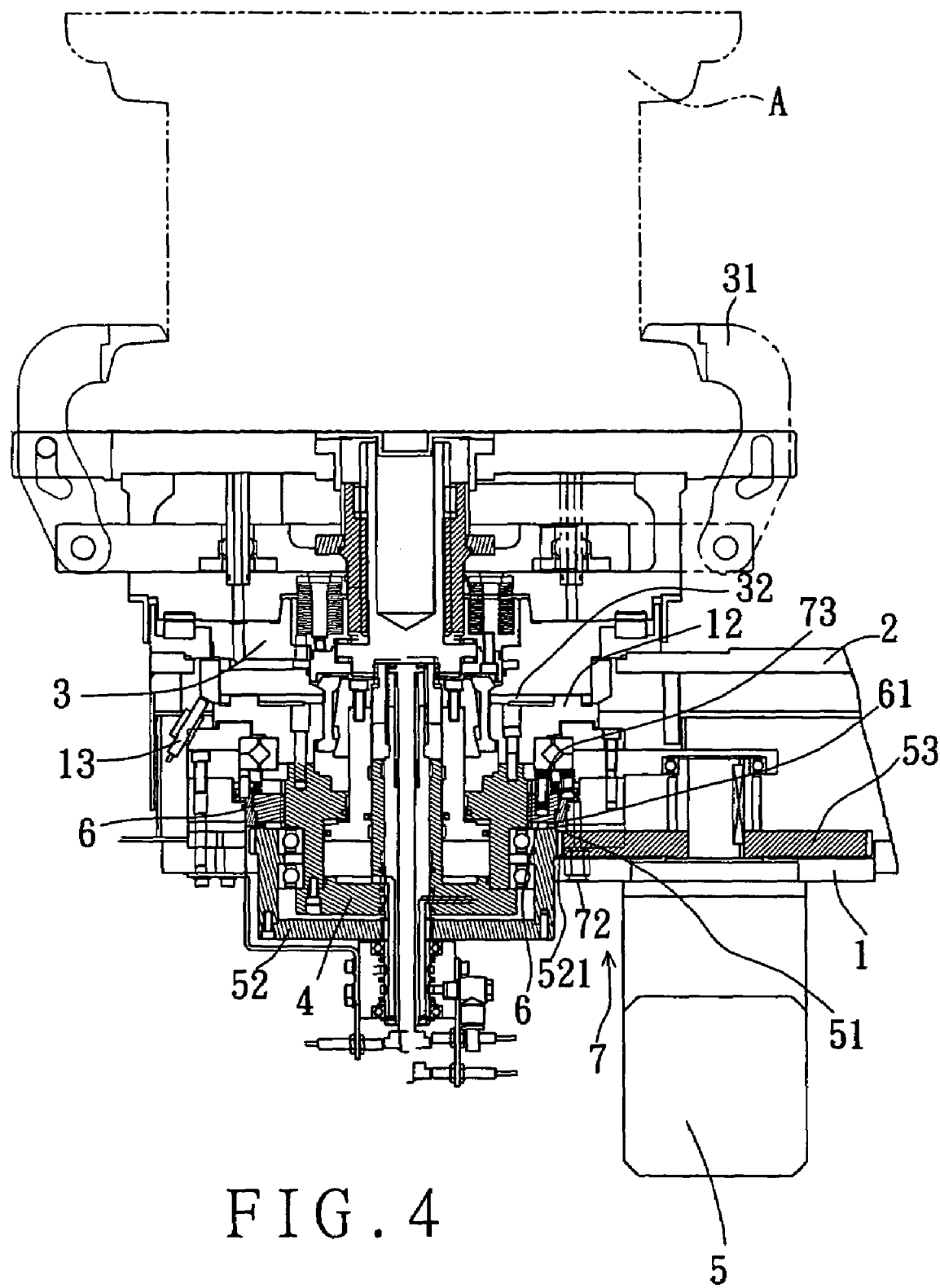
FIG. 4 is a section of the invention with the clutch engaged with the transmission gear, and the clamping jaws clamping the work piece.
Figure 5:
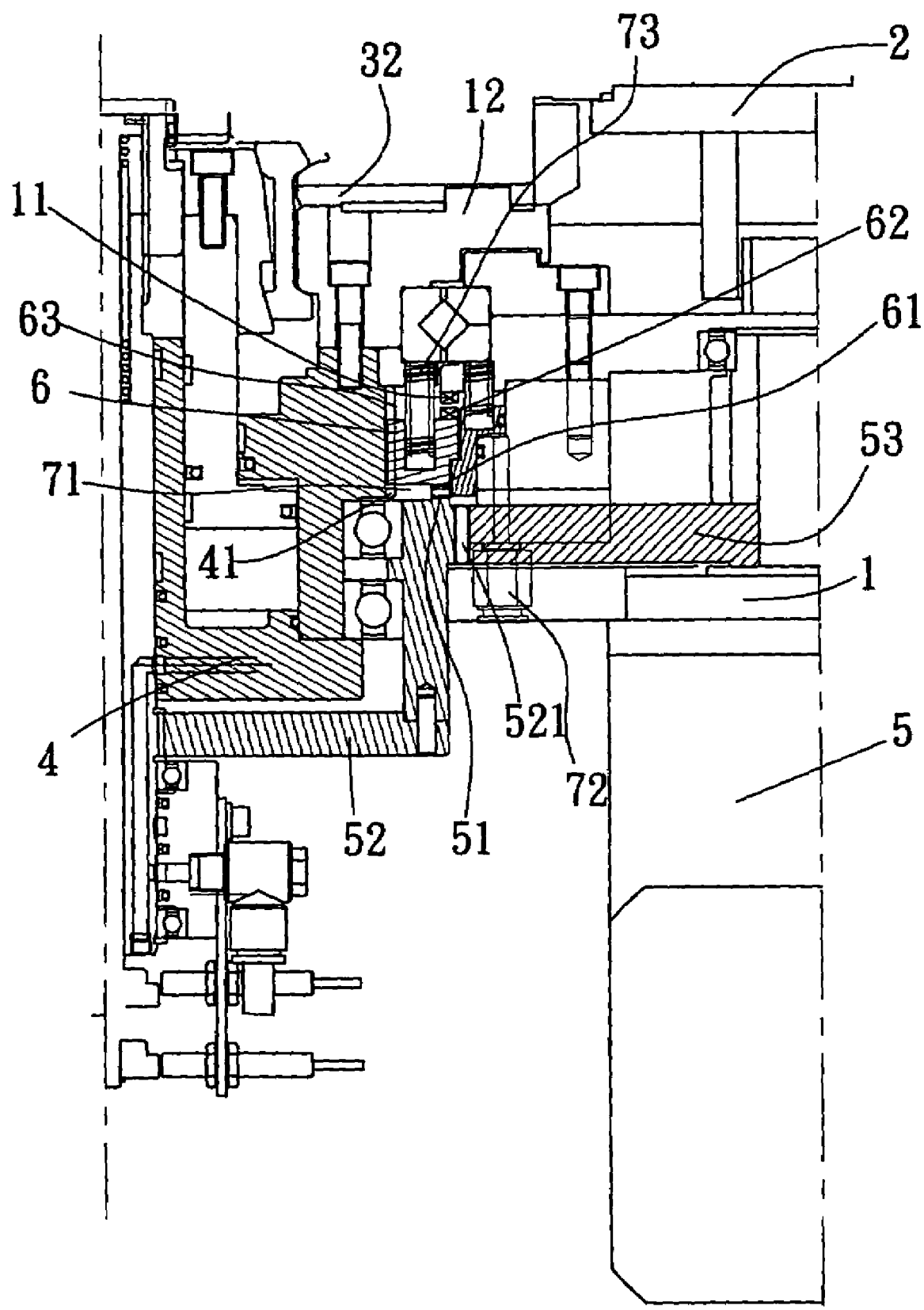
FIG. 5 is a partial enlarged view of FIG. 4.

Referring to FIGS. 2 to 5, a preferred embodiment of a transmission apparatus for balance test operation includes a frame 1, a rotating disk 2, two working platforms 3 (only one working platform 3 is shown in the Figs.), an inner rotating member 4, a power source 5, a clutch 6, and an actuating mechanism 7.

The frame 1 is in the shape of a vertical lathe. The rotating disk 2 is fitted on the frame 1 in a rotatable manner. The working platforms 3 are fitted on the rotating disk 2 in a symmetric and rotatable manner. Each of the working platforms 3 has several clamping jaws 31, which are used to clamp a work piece (A) after the work piece (A) is positioned on the working platform 3.

The inner rotating member 4 is fitted on the frame 1 in a rotatable manner; when one working platform 3 is rotated and moved outside after a work piece (A) held on the working platform 3 has been machined, the working platform 3 will face the inner rotating member 4.

The power source 5 is fixed on the frame 1, and it is an electric motor in the present preferred embodiment. The power source 5 is connected to a transmission gear 51 through an outer rotating member 52, an outer gear 521, and a gear disk 53 for causing rotation of the transmission gear 51; the transmission gear 51 is joined to an upper end of the outer rotating member 52, and the outer gear 521 is positioned around an outer circumferential side of the outer rotating member 52, and the gear disk 53 is fitted to the power source 5 and engaged with the outer gear 521 of the outer rotating member 52.

The clutch 6 is joined to the inner rotating member 4 in a movable manner, and it can be engaged with and disengaged from the transmission gear 51. The clutch 6 has engaging teeth 61 on a first side thereof for engaging the transmission gear 51. The clutch 6 and the inner rotating member 4 will rotate together when the clutch 6 is engaged with the transmission gear 51 at the engaging teeth 61 thereof. Furthermore, the clutch 6 has first locating teeth 62 on the other side facing in an opposite direction to that of the first side while the frame 1 has second locating teeth 11 facing the first locating teeth 62 of the clutch 6.

The actuating mechanism 7 is used for moving the clutch 6 between the engaged position and the disengaged one; the first locating teeth 62 of the clutch 6 will engage the second locating teeth 11 of the frame 1 so as to fix both the inner rotating member 4 and the clutch 6 in position as soon as the clutch 6 is moved away from the transmission gear 51 by means of the actuating mechanism 7. The actuating mechanism 7 includes a hollow portion 71, a vent pipe 72, and several restoring springs 73, which are fitted on the clutch 6. The clutch 6 has inner teeth 63 while the inner rotating member 4 has rails 41; the inner teeth 63 are engaged with the rails 41 such that the clutch 6 can be slid up and down in the hollow portion 71. The vent pipe 72 is arranged on the frame 1 for allowing compressed air to be sent into the hollow portion 71 through it. The restoring springs 73 will bias the clutch 6 towards the transmission gear 51 to make the clutch 6 engage the transmission gear 51 if no compressed air is sent into the hollow portion 71 to push the clutch 6. The clutch 6 will be moved upwards to disengage the transmission gear 51, and compress the restoring springs 73 when compressed air is sent into the hollow portion 71 through the vent pipe 72. And, the first locating teeth 62 of the clutch 6 will engage the second locating teeth 11 of the frame 1 so as to make both the inner rotating member 4 and the clutch 6 unmovable as soon as the clutch 6 is moved away from the transmission gear 51 to an uppermost portion of the hollow portion 71.

In order for the working platforms 3 to be located exactly in the correct position, the working platforms 3 have several locating grooves 32 on a bottom thereof, and the inner rotating member 4 has several locating blocks 12 on an upper side thereof, which are to be fitted on the locating grooves 32 for locating the working platforms 5 in the correct position. Furthermore, the frame 1 has a position sensor 13 thereon, which is used to sense position of the working platforms 3 and the inner rotating member 4 after the working platforms 3 and the inner rotating member 4 are fixed; thus, it can be found out whether the working platforms 3 and the inner rotating member 4 are properly located.

In use, after the rotating disk 2 is rotated so as to make one of the working platforms 3 face and securely joined to the inner rotating member 4, the actuating mechanism 7 will exert force to separate the clutch 6 from the transmission gear 51, and next the first locating teeth 62 of the clutch 6 engage the second locating teeth 11 of the frame 1 to fix the inner rotating member 4, and the clamping jaws 31 clamp a work piece (A), and the actuating mechanism 7 makes the clutch 6 engage the transmission gear 51. Thus, rotation of the power source 5 will cause rotation of the transmission gear 51, the clutch 6, the inner rotating member 4, and this working platform 3 so as to test whether the work piece (A) has been positioned in a balanced position; the work piece (A) should be released and repositioned if abnormality of an unbalanced state is found.

From the above description, it can be seen that the present invention has the following advantages:

1. The present invention allows a test operation before machining: a test operation can be carried out to find out whether a work piece has been clamped in its proper position; thus, the work piece can be repositioned when abnormality exists, preventing the work piece, the cutting tools, and the lathe from being damaged.

2. The present invention is environment friendly to use and easy to maintain: compressed air is used as the power, eliminating the need to use an oil hydraulic device, for which oil change and maintenance have to be carried out regularly.

What is claimed is:

1. A transmission apparatus for balance test operation, comprising a frame;

a rotating disk fitted on the frame in a rotatable manner;

two working platforms, the working platforms being fitted on the rotating disk in a symmetric and rotatable manner; each of the working platforms having a plurality of clamping jaws for clamping a work piece;

an inner rotating member, the inner rotating member being fitted on the frame in a rotatable manner;

a power source fixed on the frame; the power source being connected with a transmission gear for causing rotation of the transmission gear;

a clutch joined to the inner rotating member in a movable manner; the clutch being capable of being engaged with and disengaged from the transmission gear; the clutch having plural engaging teeth on a first side thereof; the clutch and the inner rotating member being gong to rotate together when the clutch is engaged with the transmission gear at the engaging teeth thereof; and an actuating mechanism, the actuating mechanism being used for moving the clutch between a disengaged position and an engaged one, in which engaged position the clutch is engaged with the transmission gear;

whereby after the rotating disk is rotated so as to make one of the working platforms face and securely joined to the inner rotating member, the actuating mechanism will exert force to separate the clutch from the transmission gear, and the clamping jaws clamp a work piece on said working platform, and next the actuating mechanism will make the clutch engage the transmission gear; thus, rotation of the power source will cause rotation of the transmission gear, the clutch, the inner rotating member, and said working platform so as to carry out a test in respect of balance of the work piece.

2. The transmission apparatus for balance test operation as recited in claim 1, wherein the power source is an electric motor.

3. The transmission apparatus for balance test operation as recited in claim 1, wherein the power source is connected to a transmission gear through an outer rotating member, an outer gear, and a gear disk; the outer gear being positioned around an outer circumferential side of the outer rotating member; the transmission gear being joined to an upper end of the outer rotating member; the gear disk being fitted to the power source and engaged with the outer gear positioned around the outer rotating member.

4. The transmission apparatus for balance test operation as recited in claim 1, wherein the actuating mechanism includes a hollow portion, a vent pipe, and a plurality of restoring springs fitted on the clutch; the clutch being engaged with the inner rotating member in such way as to be capable of sliding up and down in the hollow portion; the vent pipe allowing compressed air to be sent into the hollow portion through it; the clutch being going to be moved upwards to disengage the transmission gear, and compress the restoring springs when compressed air is sent into the hollow portion through the vent pipe; the restoring springs biasing the clutch towards the transmission gear to make the clutch engage the transmission gear when no compressed air is sent to push the clutch.

5. The transmission apparatus for balance test operation as recited in claim 1, wherein the clutch has plural first locating teeth on other side facing in an opposite direction to that of the first side, and the frame has plural second locating teeth facing the first locating teeth of the clutch; the first locating teeth of the clutch being going to engage the second locating teeth of the frame so as to make both the inner rotating member and the clutch unmovable as soon as the clutch is moved away from the transmission gear by means of the actuating mechanism.

6. The transmission apparatus for balance test operation as recited in claim 1, wherein each of the working platforms has a plurality of locating grooves on a bottom thereof, and the inner rotating member has a plurality of locating blocks on an upper side thereof, which are to be fitted on the locating grooves for locating the working platforms.

7. The transmission apparatus for balance test operation as recited in claim 1, wherein the frame has a position sensor thereon; the position sensor being used to sense position of the working platforms and the inner rotating member after the working platforms and the inner rotating member are fixed; thus, it can be found out whether the working platforms and the inner rotating member are located.

8. The transmission apparatus for balance test operation as recited in claim 1, wherein the clutch has a plurality of inner teeth, and the inner rotating member has a plurality of rails, with which the inner teeth are engaged such that the clutch can be slid up and down in the hollow portion.

* * * * *